(12) United States Patent
Lindblad et al.

(10) Patent No.: US 8,940,218 B1
(45) Date of Patent: Jan. 27, 2015

(54) DE-FOCUSED LASER ETCHING OF A LIGHT DIFFUSER

(75) Inventors: Scott Lindblad, Lakeville, MN (US); David Neuman, Randolf, MN (US)

(73) Assignee: Automated Assembly Corporation, Lakeville, MN (US)

(*) Notice: Subject to any disclaimer, the term of this patent is extended or adjusted under 35 U.S.C. 154(b) by 278 days.

(21) Appl. No.: 13/589,451

(22) Filed: Aug. 20, 2012

(51) Int. Cl.
  *B23K 26/36* (2014.01)
  *B23K 26/00* (2014.01)
(52) U.S. Cl.
  CPC ......... *B23K 26/0036* (2013.01); *B23K 26/0024* (2013.01)
  USPC ...... 264/400; 264/446; 264/482; 219/121.61; 219/121.68; 219/121.69; 216/94
(58) Field of Classification Search
  CPC ........... B23K 26/0021; B23K 26/0024; B23K 26/0036; B23K 26/0066; B23K 35/3613
  USPC ..................... 264/400, 446, 482; 219/121.61; 219/121.67–121.73; 216/94; 204/157.15; 65/33.2
  See application file for complete search history.

(56) References Cited

U.S. PATENT DOCUMENTS

| | | | |
|---|---|---|---|
| 5,609,778 A * | 3/1997 | Pulaski et al. ........... | 219/121.69 |
| 5,817,243 A | 10/1998 | Shaffer | |
| 6,388,780 B1 * | 5/2002 | Monaghan et al. ............. | 359/35 |
| 6,631,558 B2 * | 10/2003 | Burgess ......................... | 29/852 |
| 7,336,895 B2 | 2/2008 | Okazaki | |
| 7,762,704 B2 | 7/2010 | Brychell | |
| 7,959,343 B2 | 6/2011 | Ijzerman et al. | |

* cited by examiner

*Primary Examiner* — Samuel M Heinrich
(74) *Attorney, Agent, or Firm* — Crawford Maunu PLLC

(57) ABSTRACT

Approaches for making a light-transmitting panel are disclosed. A panel is positioned on a support structure, and a stencil is positioned between a surface of the panel and a laser head. The stencil includes a plurality of openings. A defocused laser beam generated by the laser head is scanned over the openings in the stencil. The width of the defocused laser beam at a location at which the laser beam strikes the panel is at least as large as a size of the desired disruption, and the laser head is powered at a level and moved at a rate that creates a disruption in the surface of the panel at each opening.

32 Claims, 3 Drawing Sheets

DE-FOCUSED LASER ETCHING OF A LIGHT DIFFUSER

FIELD OF THE INVENTION

The embodiments of the present invention generally relate to laser etching of a diffuser panel.

BACKGROUND

LED-based lighting is becoming more popular due in part to the energy efficient qualities and durability of LEDs. One popular application is advertising and public information signage. In some implementations, LEDs are placed along one or more edges of a light-transmitting panel, and the light-transmitting panel is configured to evenly emit light from the LEDs through a surface of the panel.

With an edge-lit light-transmitting panel, light from the LEDs is spread evenly through the panel by total internal reflection. Disruptions formed on the surface of the panel scatter incident light so that light is emitted from the surface of the panel. The disruptions are sometimes etched with a laser into the surface of the panel. However, in some approaches laser etching can be time-consuming and thereby add to the cost of the end product.

Approaches that address these and other related issues are therefore desirable.

SUMMARY

According to one embodiment, a method of making a light-transmitting panel is provided. The method includes positioning a panel on a support structure and positioning a stencil between a surface of the panel and a laser head. The stencil includes a plurality of openings. A defocused laser beam generated by the laser head is scanned over the openings in the stencil. The width of the defocused laser beam at a location at which the laser beam strikes the panel is at least as large as a size of the desired disruption, and the laser head is powered at a level and moved at a rate that creates a disruption in the surface of the panel at each opening.

In another embodiment, a system for making a light-transmitting panel is provided. The system includes a support structure for supporting a panel and a transport assembly mounted on the support structure. A laser head is mounted on the transport assembly, and the laser head is movable by the transport assembly in x, y, and z axes relative to the panel. A stencil is mounted to the transport assembly between the laser head and the panel, and the stencil includes a plurality of openings. A programmable controller is coupled to the transport assembly and to the laser head. The programmable controller is configured with instructions that when executed cause the programmable controller to perform operations of defocusing a laser beam generated by the laser head from the panel. The width of the defocused laser beam at a location at which the laser beam strikes the panel is at least as large as a size of the desired disruption. The programmable controller further powers the laser head and moves the laser head and the defocused laser beam over the openings in the stencil. The laser head is powered at a level and moved at a rate that creates a disruption in the surface of the panel at each opening in the stencil.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Prior approaches by which patterns of disruptions are formed on light-transmitting panels may be time-consuming and undesirably add to production costs. One or more embodiments reduce production time and thereby reduce costs associated with making light-transmitting panels.

For many signage applications, an even level of light emitted from the entire surface of the light-transmitting panel may be desirable. Different patterns of disruptions on light-transmitting panels have been used to different effect. One pattern that has been found to be particularly useful is an edge-to-edge pattern of disruptions formed on the surface of the panel.

A prior approach for making the pattern of disruptions involves cycling power to a laser as a laser head is moved across the panel. The laser is focused on the panel and moved laterally over the panel. When the laser head reaches the leading edge of a position at which a disruption is to be etched, the laser is powered on and the moving laser etches a line that forms a part of the overall disruption. When the laser head reaches the trailing edge of the disruption, power is removed from the laser and the laser head moves to the leading edge of the next disruption in the pattern and the cycle is repeated. When the laser head reaches the edge of the panel, the laser head is repositioned in order to perform another lateral scan of the panel. The repositioning of the laser head is generally orthogonal to the lateral scan direction. Because the laser is focused on the panel and only a thin line is etched within each disruption in a row of disruptions, multiple passes of the laser are required to etch a single row of disruptions. For example, for a 0.060" disruption, as many as four passes may be required. Thus, with current approaches multiple passes or scans of the laser have been used to etch a disruption.

In one or more embodiments, a single pass of the laser may be used to etch a row of disruptions on the panel through openings in a stencil. Instead of having to make multiple scans of the laser over the panel in order to make a single row of disruptions, one or more embodiments create a row of disruptions with a single edge-to-edge scan with the laser. A stencil has multiple openings and is placed between a laser and the panel to be etched. The laser is defocused from the surface of the panel in order to make the width of the laser beam at least as wide as the desired disruptions. In one embodiment, the laser beam is defocused to a width that is at least as wide as the openings in the stencil. The defocused laser is then scanned over the openings in the stencil. The laser is powered at a level and moved at a speed sufficient to create a disruption on the panel by the defocused laser beam through each opening. Thus, where prior approaches required multiple passes to create a row of disruptions on the panel, one or more embodiments can form a row of disruptions in only a single pass of the laser over the stencil.

Figure 1:
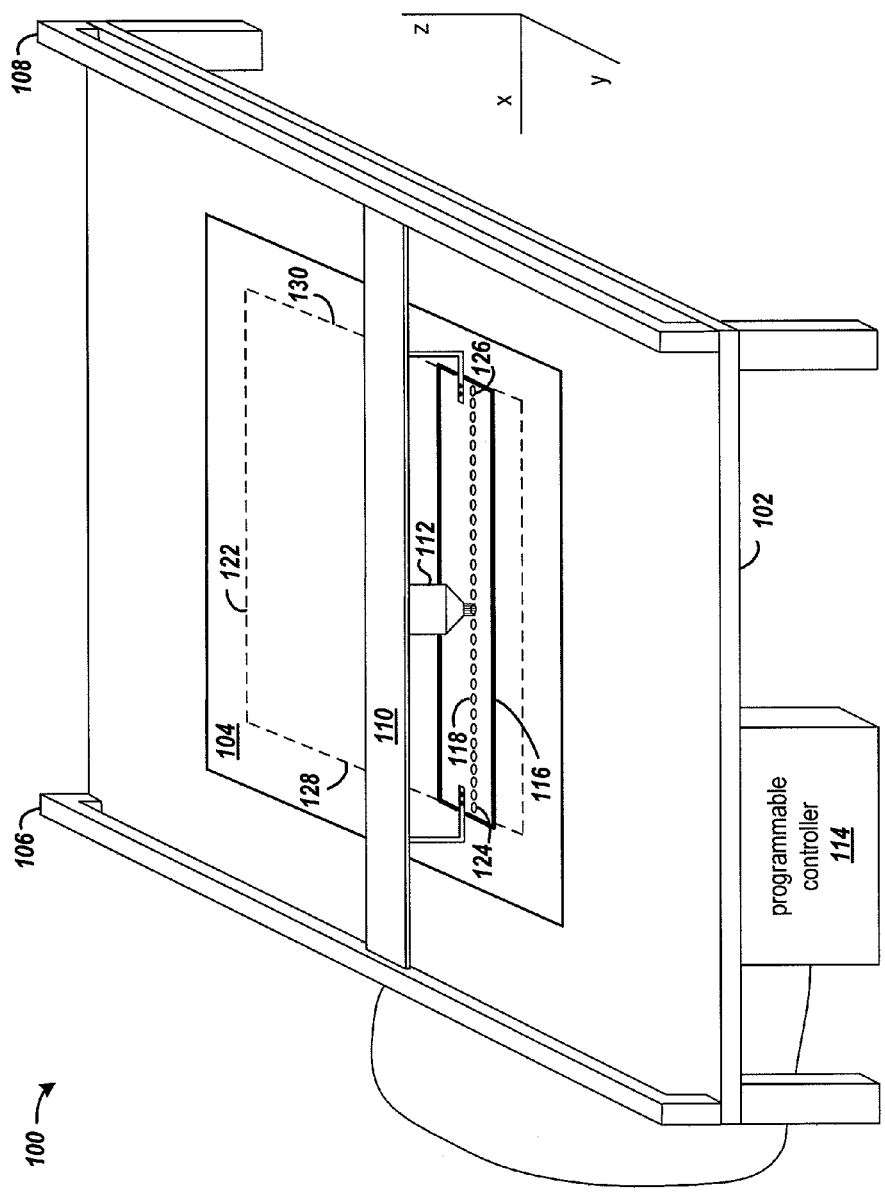
FIG. 1 shows a laser etching system.

FIG. 1 shows a laser etching system 100 in accordance with one or more embodiments. The laser etching system generally includes a support structure 102 that is arranged to support the panel 104 that is to be etched along with a transport assembly that supports the laser and moves the laser over the panel. The transport assembly includes rails 106 and 108 and carriage member 110. The laser head 112 is mounted to the carriage member. A stencil 116, which may contain openings (e.g., opening 118) according to the desired pattern, is mounted to the carriage member. The programmable controller 114 is coupled to the rails, carriage member, and laser head for controlling overall operation of the laser etching system. The programmable controller may be a computing arrangement that includes a processor, memory, and retentive storage. The control and operations described herein may be implemented by programming the controller 114 to power, focus, and move the laser head, as well as move the stencil 116 when needed.

Laser head 112 is height-adjustable parallel with the z-axis under the control of the programmable controller. In one embodiment, the height adjustment is used to defocus the laser relative to the surface of the panel. The laser head is movable parallel to the x-axis along the carriage member 110. The carriage member is movable parallel to the y-axis along rails 106 and 108. In an example implementation, a belt-drive (not shown) moves the laser head along the carriage member, and a screw-drive moves the carriage member along the rails. The laser head can be moved along the x-axis at a high rate of speed, and the x-axis may be referred to as the high-speed axis. The laser head is incrementally moved along the y-axis after etching a row of disruptions, and the y-axis may be referred to as the low-speed axis.

In one or more embodiments, the laser etching system 100 is operated as follows to form the pattern of disruptions on the surface of the panel 104. The laser is defocused from the panel to be etched by raising the height of the laser head 112 in a direction parallel to the z-axis, which raises the focal point of the laser beam above the surface of the panel. The laser is then powered and moved along the row of openings in the stencil 116 in the direction of the x-axis. With use of the stencil, the laser head may be continuously powered as the laser head is moved over the stencil. This eliminates the need for complex programming for controlling power cycling to create disruptions of the desired shape as in the prior art. Alternatively, power to the laser head may be cycled, with the laser head powered as it passes over openings in the stencil and power removed as the laser head moves between openings. In one embodiment, the defocused laser beam has a width that is at least as wide as the width of the openings. With a sufficient level of power and a suitable scan speed, the defocused laser beam, in a single pass, etches a row of disruptions of the desired size(s) in the surface of the panel through the openings in the stencil. The size of each opening is the desired size of the corresponding disruption. Thus, an entire row of disruptions can be etched with a single pass of the laser. In one embodiment, the stencil has a single row of openings through which one row of disruptions is etched in a single pass. In another embodiment, the stencil has multiple rows of openings, the laser beam may be defocused to cover multiple openings (e.g., one in each row), and the laser is powered and moved at a rate that etches disruptions through the multiple openings in a single pass.

After etching a row(s) of disruptions with the stencil in one position, power to the laser is removed or reduced, and the carriage member 110 is moved to a position for etching the next row(s). The carriage member, with the attached laser head 112 and stencil 116, is moved in a direction parallel to the y-axis and a distance for the desired pitch. For example, for a 0.10 inch pitch, the carriage member is moved 0.10 inch. Power to the laser is then re-supplied, and the laser is moved along the row of openings as described above. The process is repeated for as many rows of disruptions are required in the light-transmitting panel.

Once the complete pattern of disruptions has been etched into the panel 104, the panel can be cut into the desired shape. The same apparatus can be used for both the fast etching of the disruptions and the cutting of the panel. Laser cutting the panel eliminates the need for polishing the edges of the cut shape as may be required for blade cuts.

In one embodiment, the stencil 116 is movably attached to the carriage member 110 such that the stencil is movable in the direction of the y-axis. This allows the stencil to be moved out of the way for cutting the panel. The movement of the stencil may be by pneumatics or by a servomechanism (not shown). The stencil is moved to permit cutting of the panel, and the laser head is moved to a position at which cutting of the panel is to begin. The laser is focused at the panel 104 by moving the laser head 112 closer to the panel in the direction of the z-axis. The perimeter to be cut by the laser is shown by the dashed lines of rectangle 122. Power is supplied to the laser, and the laser head is moved along the perimeter of rectangle 122 to cut the panel to the desired shape. It will be recognized that the panel can be cut to any desired shape and is not limited to rectangles.

Though only a single laser head and single stencil are shown, it will be recognized that multiple laser heads and/or multiple stencils could be used to further reduce the time required to etch an entire panel. In one implementation, the light-transmitting panel is a transparent thermoplastic such as polymethyl methacrylate (PMMA or "acrylic glass"), and a long wavelength carbon dioxide laser is used to etch the disruptions and cut the panel. It will be appreciated that alternative materials may be used for the light-transmitting panel depending on application requirements, and alternative types of lasers may be used to achieve the desired pattern of disruptions in the panel.

The stencil is constructed from stainless steel in one embodiment. The openings in the stencil may be any shape that is suitable for a light-transmitting panel. In one embodiment, the openings are round. While the stencil is shown as being attached to the carriage member 110, in another embodiment, the stencil may have openings that conform to the complete desired pattern of disruptions, and the stencil may be disposed on the panel without being attached to the carriage member. In such an embodiment, movement of the laser head would need to be aligned with the openings in the stencil.

In a further embodiment, the sizes of the disruptions vary according to the positions of the disruptions relative to the to-be-lit edge(s) of the panel and the size of the panel. The disruptions are graduated in size from the to-be-lit edge(s) toward the center of the panel. This particular disruption pattern aids in the emission of even levels of light from the surface of the panel. For a panel that is to have two opposite edges lit, the disruptions at the to-be-lit edges of the panel are the smallest, and the disruptions grow progressively larger toward the center of the panel. For a panel having one edge that is to be lit, the smallest disruptions are at the to-be-lit edge of the panel, and the disruptions grow progressively larger toward the opposite edge of the panel. The range of sizes for the disruptions may be varied according to the size of the edge-lit panel. For smaller panels, the disruptions may be larger than the disruptions for larger panels. For example, for panels approximately 3' by 5', the sizes of the disruptions may range from 0.020" at the to-be-lit edges of the panel to 0.060" at the center of the panel.

The sizes of the openings in the stencil 116 correspond to the desired sizes of the disruptions. For example, in stencil 116 openings 124 and 126 are the smallest openings in the stencil for a panel in which edges 128 and 130 are to be lit. The sizes of the openings gradually increase with each opening position nearer the center of the stencil.

Figure 2:
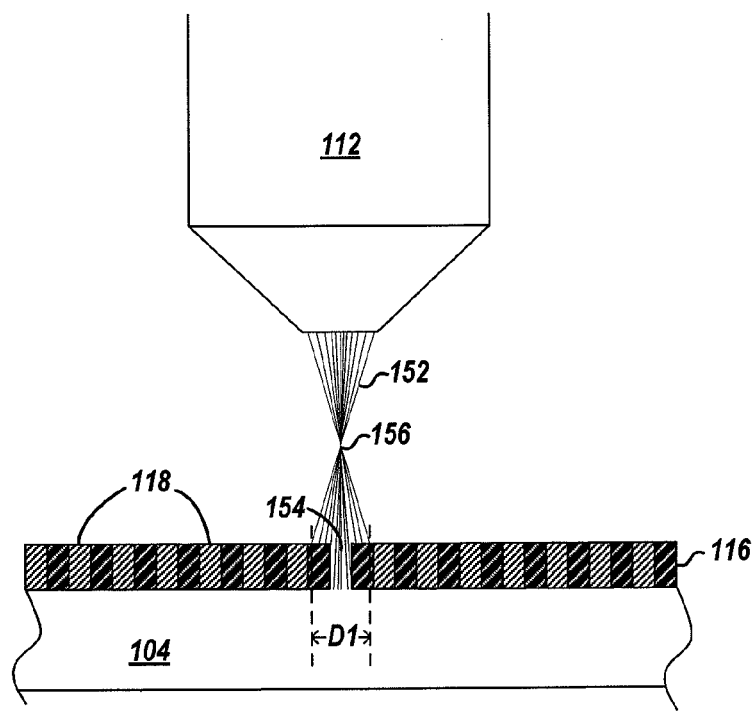
FIG. 2 shows a partial cross-sectional side view of the panel being etched and the stencil, along with the laser head and laser beam.

FIG. 2 shows a partial cross-sectional side view of the panel 104 being etched and the stencil 116, along with the laser head 112 and laser beam 152. Each opening 118 in the stencil is shown as a diagonal-line-filled area. For ease of illustration, the openings are shown as the same size even though in various embodiments the openings vary in size as described above. The width (D1) of laser beam 152 is wider than the openings 118 at the location at which the laser strikes the stencil 116. For example, the laser beam 152 is shown passing through opening 154 to the surface of the panel. The focal point 156 of the laser beam is at some point above the surface of the panel and stencil. In an example application having openings with a center-to-center pitch of 0.10 inch, the width of the laser beam may be 0.125 inch at the location at which the laser strikes the stencil 116. Though it may be preferable for the width of the laser beam to be larger than the size of the openings, the width of the laser beam may be less than the size of the opening but at least as wide as a width of the desired disruption.

Figure 3:
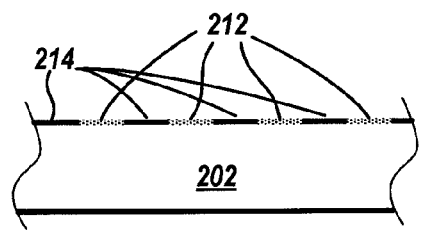
FIG. 3 shows a partial cross-sectional side view of an etched panel with one type of disruption in the surface of the panel.
Figure 4:
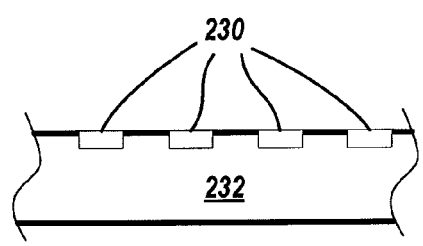
FIG. 4 shows a partial cross-sectional side view of an etched panel with concavities formed in the panel.

Different shapes and contours of disruptions in the surface of the panel may be suitable depending on the application. For example, each disruption may be a frost-like dot on the surface of the panel. Alternatively, each disruption may be a concavity formed in the surface of the panel. FIG. 3 shows a partial cross-sectional side view of an etched panel 202 with one type of disruption in the surface of the panel. The example disruptions 212 have a frost-like texture relative to un-etched, smooth portions 214 of the panel. FIG. 4 shows a partial cross-sectional side view of an etched panel with concavities 230 formed in the panel 232. A deeper concavity may provide a greater scattering of incident light than would a shallower concavity since the area of disruption is greater due to the area added by the depth.

Figure 5:
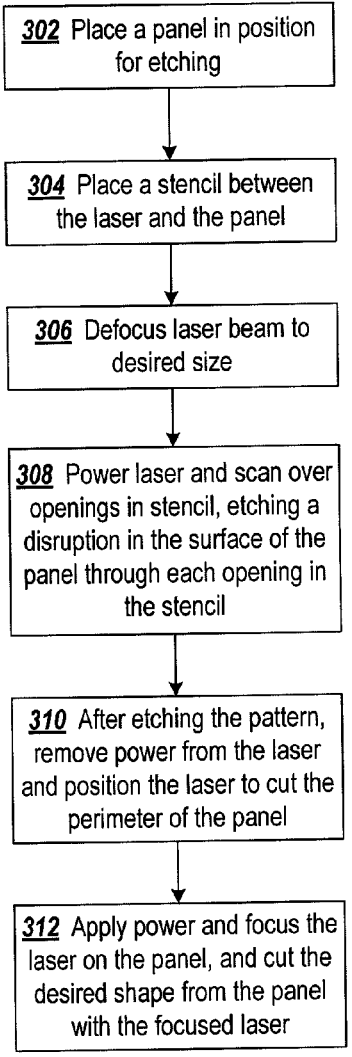
FIG. 5 is a flowchart of an example process for creating a light-transmitting panel.

FIG. 5 is a flowchart of an example process for creating a light-transmitting panel in accordance with one or more embodiments. At block 302, a panel is positioned for laser etching. As explained above, the panel may be an acrylic panel and placed on a support table. The dimensions of the panel are application dependent. In some applications cell-cast acrylic has been found to be more useful than extruded acrylic.

At block 304, a stencil is positioned between a laser and the panel to be etched. In one embodiment, the stencil is stainless steel. The stencil is constructed to withstand application of the laser at the energy level used to etch the disruptions in the panel. In one application, the stencil is 0.015 inch thick.

The laser is defocused at block 306. The defocused laser produces a laser beam having a width that is at least the size of the disruptions to be etched. In one embodiment, the laser is defocused by raising the height of the laser head relative to the panel. In another embodiment, the laser may be defocused using optics within the laser head, depending on the capabilities of the laser system.

At block 308, power is applied to the laser and the laser is scanned over the openings in the stencil, thereby creating a row of disruptions on the surface of the panel. The speed at which the laser head is moved over the stencil depends on the level of power supplied to the laser and the desired disruption on the panel. For example, to create a disruption having frost-like texture, an example laser may be powered at C Watts and moved at K inches/second; at 4C Watts the laser can be moved at 4K inches/second. For creating concavities in the panel, a greater amount of power or a slower scan may be required.

After the desired pattern of disruptions has been etched on the panel, power is removed from the laser, and the laser is positioned for cutting the panel to the desired shape at block 310. At block 312, power is re-supplied to the laser, and the laser is focused at the surface (or slightly below the surface) of the panel. In one embodiment, the laser is focused on the panel by moving the laser head 112 closer to the panel than the laser head was positioned for creating the disruptions. The panel is cut to the desired shape with the focused laser by moving the laser head along the perimeter of the shape.

Figure 6:
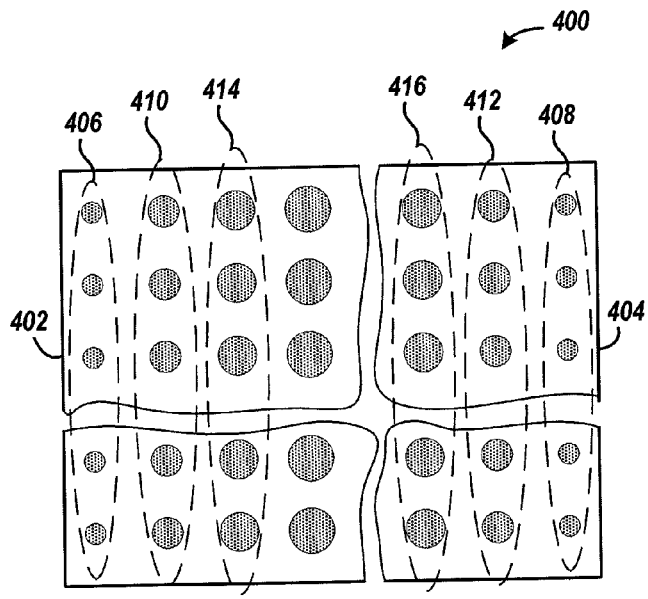
FIG. 6 is a top view of portions of a light-transmitting panel.

FIG. 6 is a top view of portions of a light-transmitting panel 400 made in accordance with one or more embodiments. The example pattern of disruptions is for an application in which two edges of the panel are to be lit. As such the disruptions at the to-be-lit edges of the panel are the smallest, and the disruptions grow gradually larger toward the center of the panel. For example, edges 402 and 404 are the edges to which LEDs may be attached. The disruptions 406 along edge 402 and the disruptions 408 along edge 404 are the smallest disruptions, disruptions 410 and 412 are larger than disruptions 406 and 408, disruptions 414 and 416 are larger than disruptions 410 and 412, etc.

The present invention is thought to be applicable to a variety of lighting applications. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of making a light-transmitting panel, comprising:
   positioning a panel on a support structure;
   positioning a stencil between a surface of the panel and a laser head, wherein the stencil includes a plurality of openings; and
   scanning with a defocused laser beam generated by the laser head over the openings in the stencil, wherein a width of the defocused laser beam at a location at which the defocused laser beam strikes the panel is at least as large as a size of a desired disruption, and the laser head is powered at a level and moved at a rate that creates the disruption in the surface of the panel at each opening.

2. The method of claim 1, wherein the width of the defocused laser beam is at least as wide as the openings in the stencil.

3. The method of claim 1, wherein the scanning includes continuously powering the laser head as the laser head is moved over the stencil.

4. The method of claim 1, wherein the scanning includes cycling power to the laser head.

5. The method of claim 1, wherein the stencil has one or more rows of openings, and the scanning includes moving the laser head along each row in a single pass in forming one or more respective rows of disruptions.

6. The method of claim 1, further comprising:
removing the stencil from between the panel and the laser head;
focusing the defocused laser beam on the panel; and
cutting the panel to a desired shape with the focused laser beam.

7. The method of claim 6, further comprising:
before the scanning with the defocused laser beam, moving the laser head to a first distance above the panel such that the defocused laser beam is focused above the panel; and
wherein the focusing of the defocused laser beam on the panel includes moving the laser head to a second distance above the panel such that the defocused laser beam is focused on the panel.

8. The method of claim 1, wherein the openings are of a plurality of different sizes, and the defocused laser beam has a width that spans a widest one of the openings.

9. The method of claim 1, wherein the plurality of openings includes a row of openings, first and last openings in the row have a first size, and openings in the row increase in size from the first and last openings to a center of the row.

10. The method of claim 1, wherein the plurality of openings includes a row of openings, a first opening in the row has a first size, and openings in the row increase in size from the first opening to a last opening of the row.

11. The method of claim 1, wherein the openings are round.

12. The method of claim 1, wherein one or more of the disruptions is a frosted area on the surface of the panel.

13. The method of claim 1, wherein one or more of the disruptions is a concavity in the surface of the panel.

14. The method of claim 1, wherein the stencil has a row of openings, and the scanning includes:
moving the laser head along the row of openings in a single pass, wherein a row of disruptions is formed on the surface of the panel;
after moving the laser head along the row of openings, moving the stencil and the laser head in a direction orthogonal to the row of disruptions; and
repeating the moving of the laser head along the row of openings and the moving of the stencil and laser head in a direction orthogonal to the row of disruptions a plurality of times.

15. The method of claim 1, wherein centers of adjacent openings in the plurality of openings are spaced at least 0.10 inch apart.

16. The method of claim 1, wherein the stencil has two or more rows of openings, and the scanning includes moving the laser head along the two or more rows of openings in a single pass.

17. The method of claim 1, wherein the stencil is stainless steel.

18. The method of claim 1, wherein the panel is an acrylic panel.

19. A system for making a light-transmitting panel, comprising:
a support structure for supporting a panel;
a transport assembly mounted on the support structure;
a laser head mounted on the transport assembly, wherein the laser head is movable by the transport assembly in x, y, and z axes relative to the panel;
a stencil mounted to the transport assembly between the laser head and the panel, wherein the stencil includes a plurality of openings; and
a programmable controller coupled to the transport assembly and to the laser head, wherein the programmable controller is configured with instructions that when executed cause the programmable controller to perform operations including:
defocusing a laser beam generated by the laser head from the panel, wherein a width of the defocused laser beam at a location at which the laser beam strikes the panel is at least as large as a size of a desired disruption on the panel; and
powering the laser head and moving the laser head and the defocused laser beam over the openings in the stencil, wherein the laser head is powered at a level and moved at a rate that creates a disruption in the surface of the panel at each opening in the stencil.

20. The system of claim 19, wherein the plurality of openings includes a row of openings, and the programmable controller is further configured to perform operations including:
after moving the laser head along the row of openings, moving the stencil and the laser head in a direction orthogonal to a row of disruptions; and
repeating the moving of the laser head along the row of openings and the moving of the stencil and laser head in a direction orthogonal to the row of disruptions, a plurality of times.

21. The system of claim 19, wherein the programmable controller is further configured to perform operations including:
removing the stencil from between the panel and the laser head;
focusing the laser beam on the panel; and
moving the focused laser beam along a perimeter of a desired shape.

22. The system of claim 19, wherein the width of the laser beam is at least as wide as the openings in the stencil.

23. The system of claim 19, wherein the programmable controller is further configured to continuously power the laser head as the laser head is moved over the stencil.

24. The system of claim 19, wherein the programmable controller is further configured to cycle power to the laser head as the laser head is moved over the stencil.

25. The system of claim 19, wherein the stencil has one or more rows of openings, and the programmable controller is further configured to move the laser head along each row in a single pass in forming one or more respective rows of disruptions.

26. The system of claim 19, wherein the programmable controller is further configured to perform operations including:
removing the stencil from between the panel and the laser head;
focusing the laser beam on the panel; and
powering the laser head and moving the laser head for cutting the panel to a desired shape with the focused laser beam.

27. The system of claim 26, wherein the programmable controller is further configured to perform operations including:
moving the laser head to a first distance above the panel such that the laser beam is focused above the panel for defocusing the laser beam; and
moving the laser head to a second distance above the panel such that the laser beam is focused on the panel for focusing the laser beam.

28. The system of claim 19, wherein the openings are of a plurality of different sizes, and the laser beam has a width that spans a widest one of the openings.

29. The system of claim 19, wherein the plurality of openings includes a row of openings, first and last openings in the row have a first size, and openings in the row increase in size from the first and last openings to a center of the row.

30. The system of claim 19, wherein the plurality of openings includes a row of openings, a first opening in the row has a first size, and openings in the row increase in size from the first opening to a last opening of the row.

31. The system of claim 19, wherein the openings are round.

32. The system of claim 19, wherein the stencil is stainless steel.

\* \* \* \* \*

UNITED STATES PATENT AND TRADEMARK OFFICE
CERTIFICATE OF CORRECTION

| | | |
|---|---|---|
| PATENT NO. | : 8,940,218 B1 | Page 1 of 1 |
| APPLICATION NO. | : 13/589451 | |
| DATED | : January 27, 2015 | |
| INVENTOR(S) | : Lindblad et al. | |

It is certified that error appears in the above-identified patent and that said Letters Patent is hereby corrected as shown below:

On the Title Page

Item (75) Inventors: "David Neuman, Randolf, MN (US)" should read -- David Neuman, Randolph, MN (US) --.

Signed and Sealed this
Thirty-first Day of May, 2016

Michelle K. Lee
*Director of the United States Patent and Trademark Office*